United States Patent
Sun et al.

(10) Patent No.: US 11,254,574 B2
(45) Date of Patent: Feb. 22, 2022

(54) GRAPHENE MATERIAL PREPARED FROM WASTE TIRE AND PREPARATION METHOD THEREOF

(71) Applicant: ZHEJIANG A & F UNIVERSITY, Hangzhou (CN)

(72) Inventors: Qingfeng Sun, Hangzhou (CN); Chao Wang, Hangzhou (CN); Hanwei Wang, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 498 days.

(21) Appl. No.: 16/232,555

(22) Filed: Dec. 26, 2018

(65) Prior Publication Data

US 2020/0189913 A1 Jun. 18, 2020

(51) Int. Cl.
  *C01B 32/184* (2017.01)
  *B29B 17/02* (2006.01)
  *B29B 17/04* (2006.01)

(52) U.S. Cl.
  CPC ............ *C01B 32/184* (2017.08); *B29B 17/02* (2013.01); *B29B 17/0404* (2013.01); *B29B 2017/0468* (2013.01); *B29B 2017/0496* (2013.01); *C01P 2002/74* (2013.01); *C01P 2002/82* (2013.01); *C01P 2004/03* (2013.01); *C01P 2004/04* (2013.01); *C01P 2004/30* (2013.01); *C01P 2006/40* (2013.01)

(58) Field of Classification Search
  CPC ............... C01B 32/184; C01P 2002/74; C01P 2002/82; C01P 2004/03; C01P 2004/04; C01P 2004/30; C01P 2006/40
  See application file for complete search history.

(56) References Cited

FOREIGN PATENT DOCUMENTS

| CN | 101708841 A | * | 5/2010 |
|---|---|---|---|
| CN | 103130223 A | | 6/2013 |
| CN | 108163844 A | | 6/2018 |
| CN | 108423665 A | | 8/2018 |

OTHER PUBLICATIONS

Boota, M., et al. "Waste tire derived carbon-polymer composite paper as pseudocapacitive electrode with long cycle life." ChemSusChem 8.21 (2015).*
Kumar, Rudra, Thiruvelu Bhuvana, and Ashutosh Sharma. "Tire waste derived turbostratic carbon as an electrode for a vanadium redox flow battery." ACS Sustainable Chemistry & Engineering 6.7 (2018): 8238-8246.*

* cited by examiner

*Primary Examiner* — Richard M Rump

(57) ABSTRACT

A graphene material prepared using waste tires and a preparation method thereof. Waste tires are crushed to 30-200 meshes to obtain tire powders. The tire powders are mixed with KOH or an aqueous solution of KOH to obtain a homogeneous mixture. The mixture is dried at 50-90° C. for 12-48 hours, heated and calcinated in a tube furnace under a protective gas for 1-48 hour to obtain a black lump. The black lump is washed with distilled water, dilute hydrochloric acid or dilute sulfuric acid for at least 3 times, and then washed with deionized water for at least 3 times to obtain a black powder. The black powder is dried to obtain the graphene material. The graphene material has a three-dimensional structure composed of oligolayer graphene intertwined and connected with each other, has a high crystallinity, is not easily agglomerated, and thus can maintain nano-effect of the graphene material.

13 Claims, 15 Drawing Sheets

GRAPHENE MATERIAL PREPARED FROM WASTE TIRE AND PREPARATION METHOD THEREOF

RELATED APPLICATION

The present application claims the benefit of the Chinese patent application CN201811462315.2 filed Dec. 12, 2018, which incorporated herein by reference in its entirety.

FIELD OF THE INVENTION

The present invention relates to the technical field of preparation of graphene, and specifically to a graphene material prepared from waste tire and a preparation method thereof.

BACKGROUND OF THE INVENTION

Since being discovered in 2004, graphene has become one of the most interesting materials at present due to its excellent physicochemical properties. Both the development and further application of graphene are based on the technology of preparation of graphene. Therefore, it is urgent to develop a simple, green and large scale of production method of graphene to meet more and more demands for graphene.

The preparation method of graphene which is firstly developed involves stripping of natural graphite, so preparation methods using natural graphite as source have been widely researched and developed. Such preparation methods comprise micromechanical exfoliation, liquid-exfoliation, electrochemical exfoliation, ultrasonic exfoliation, laser exfoliation and the like. However, all these methods need to take high-quality natural graphite as raw material, and with consumption of fossil resources, natural graphite resource has become more and scarcer, so it is no longer suitable for use as a main source of graphene. At the same time, the preparation of graphene by these methods needs to take a longer time and the yield is limited, especially for physical stripping methods such as mechanical stripping, ultrasonic stripping and the like.

As an important type of liquid-exfoliation, redox processes that are expected to achieve large-scale production is used more widely. But in the preparation process, strong acids, strong oxidizing agents and other dangerous and seriously polluting reagents must be used, and the preparation processes are accompanied with very high dangerousness, so it is not in line with the concept of sustainable development.

Although the electrochemical exfoliation has a high efficiency, it requires high-quality graphite raw material as well and requires lump graphite with a good continuity, and the electrolyte waste liquid after preparation is generally toxic and difficult to dispose, so this method is also difficult to promote on a large scale.

Based on this, there are also many developments on the approaches using other carbon source materials for the synthesis of graphene, including vapor deposition method, silicon carbide epitaxial growth method, carbon nanotube conversion method, solid carbon source catalysis method and the like. Vapor deposition method typically requires severe conditions such as high vacuum and the like, and requires high-quality metal catalysis substrate to obtain single-crystal graphene, and the obtained graphene generally bears significant nucleation points, which affects the quality of graphene. At the same time, the separation of graphene from the substrate also requires certain technical means. Therefore, the vapor deposition method is still far away from further large-scale production.

Similarly, silicon carbide epitaxial growth method also requires severe synthesis conditions. Synthesis of graphene from carbon nanotubes can only obtain graphene or graphene ribbon with a limited size, and high-quality carbon nanotube is also a relatively expensive raw material.

Solid carbon source catalysis method involves converting an organic thin film into graphene by catalysis on a metal substrate, and has high requirements for the metal substrate. Therefore, there is a need for developing a method for the preparation of graphene using inexpensive and readily available raw materials with simple preparation processes.

The above researches on the preparation of graphene are almost concerned with preparation of two-dimensional (2D) graphene sheets. However, two-dimensional graphene is mainly suitable for the study of graphene properties and for the fields of ultra-thin display and 2D semiconductor. In other fields, especially in the fields of energy storage and conversion, environmental purification and intelligent sensing, three-dimensional (3D) graphene has become a more excellent choice due to its stability, high electrical conductivity and controllable porosity. Therefore, there is a need for developing a method for bulk production of 3D graphite by simple production processes using abundant and inexpensive raw materials.

As a renewable natural resource, biomass carbon source is easily available, has almost inexhaustible reserve, and thus is an ideal carbon source material. Thus, in recent years, a great deal of studies have converted it into various high-quality carbon materials. Among the studies, there is also a lot of work involves studying the preparation of graphene. Although some studies can obtain well graphene materials, natural biomaterials generally have complex compositions, so multiple steps of impurity removal processes are required during the preparation process. At the same time, natural biomaterials are generally difficult to be graphitized, so a high carbonization temperature of more than 2000° C. is usually required for preparing graphene, which requires not only higher energy consumption, but also higher requirements for the heating instrument.

In recent years, a new type of laser-inducing method for preparing graphene have been reported importantly due to their advantages of high efficiency and abilities to convert many different carbon precursors into graphene and the like. However, the method is limited to formation of a porous graphene structure only on a surface of the material, and there are certain requirements for the preparation equipment. If a large lump porous graphene needs to be prepared, a large-volume laser device which is more expensive will be required.

As a soft carbon precursor, artificial organic matter has been successfully prepared into graphene by catalysis or laser-inducing, for example, single-layer graphene is prepared with polymethyl methacrylate by catalysis and 3D porous graphene is prepared by laser-inducing polyimide. The conversion temperature is relatively low under metal catalysis. Therefore, graphene materials are expected to be obtained from artificial organic matter at a lower temperature (≤1000° C.).

As the most important type of artificial organic solid waste, automobile tires are huge in amount, difficult to dispose, and non-degradable. With development of automotive technology and explosive growth of the number of automobiles, nearly 100 million automobiles are produced worldwide every year, which makes the number of waste tires increase continually, and more than 5 billion tons of waste tires have accumulated in the world at present. Therefore, how to dispose the waste tires has become a troublesome problem for the whole world. Traditional landfill method not only is a huge waste of resources, but also is likely to cause pollution on soil and water sources. Current disposal approaches mainly include regenerating tires or taking the waste tires as additives for concrete or asphalt, but these can still only consume a small part of the waste tires with a relatively low added value. Additional approach involves pyrolysis converting the waste tires into oil and gas resources. However, such using requires high investment, and the uneven quality of the recycled tires has an adverse effect on the final product, so the disposal of waste tires needs further development.

Converting waste tires into high-quality carbon materials to endow the waste tires with higher added value becomes a promising path in rubber processing. Current research converts them into porous coke materials, which serve as supercapacitors, lithium ion battery anodes, etc. However, compared with preparation of traditional activated carbon, it has no obvious advantage. These carbon preparation processes by pyrolysis are performed mainly at a temperature of below 900° C.

In view of these issues, the claimed invention and the preferred embodiments are proposed below.

OBJECTS AND SUMMARY OF THE INVENTION

Considering that there is a need for a simple method capable of massively producing graphene, which serves as a high-quality carbon material that has superior performance and is required increasingly, the present inventors believe it would be of great significance if converting a large amount of waste tires into porous graphene by a simple approach, and their high added value also has great commercial attraction. It is expected that organic polymer molecules abundantly present in the waste tires can be converted into graphene materials by further raising temperature and adding appropriate chemical additives.

Accordingly, it is an object of the present invention to convert a large amount of waste tires which exist currently into graphene by a simple and stable method. After a great deal of researches, the present inventors have successfully converted waste tires into porous intertwined three-dimensional graphene material by an alkali thermal carbonization process, which not only opens up a high added-value path for the use of waste tires, but also very well overcomes the technical difficulty that the preparation of graphene is difficult to achieve mass-production and may require severe conditions or use hazardous reagents at present. The present invention will provide a method capable of preparing graphene on a large scale in simple steps by using waste tires.

The present invention provides a method for preparing a graphene material using waste tires comprising the steps of:

(1) crushing waste tires to 30-200 meshes to obtain a tire powder;

(2) mixing 1 part by weight of the tire powder obtained in step (1) with 1-10 parts by weight of KOH or an aqueous solution containing 1-10 parts by weight of KOH to obtain a homogeneous mixture;

(3) drying the mixture obtained in step (2) at 50-90° C. for 12-48 h;

(4) placing the dried mixture in a tube furnace and heating and calcining under a protective gas for 1-48 h to obtain a black lump; and (5) washing the black lump obtained in step (4) with water, dilute hydrochloric acid or dilute sulfuric acid for at least 3 times, then washing it with water for at least 3 times to obtain a black powder, and then drying the black powder to obtain the graphene material.

The preparation method according to the present invention, wherein the tire powder in step (1) is preferably 50-150 meshes.

The preparation method according to the present invention, preferably, in step (2), 1 part by weight of the tire powder obtained in step (1) is mixed with 1-7 parts by weight of KOH or an aqueous solution containing 1-7 parts by weight of KOH; and more preferably, in step (2), 1 part by weight of the tire powder obtained in the step (1) is mixed with 2-5 parts by weight of KOH or an aqueous solution containing 2-5 parts by weight of KOH.

In step (2), preferably, KOH is in the form of solid or saturated aqueous solution containing a corresponding part by weight of KOH. Preferably, the means for the mixing in step (2) may be at least one of grinding uniformly, ball-milling uniformly and stirring uniformly.

The preparation method according to the present invention, preferably, the temperature for the drying in step (3) is 60-80° C., and the duration for the drying is 12-24 h.

The preparation method according to the present invention, wherein the protective gas in step (4) may be at least one of nitrogen gas, argon gas and helium gas. Preferably, the rate of the heating in step (4) is 0.1-20° C. per minute, the temperature for the calcination is 800-1200° C., and the calcination duration after reaching 800-1200° C. is 1-48 h. More preferably, the rate of the heating in step (4) is 2-15° C. per minute, the temperature for the calcination is 900-1100° C., and the calcination duration after reaching 900-1100° C. is 3-12 h.

The preparation method according to the present invention, wherein the water in step (5) may be distilled water and/or deionized water. The concentration of the dilute hydrochloric acid in step (5) may be 0.1-0.5 mol/l, and preferably 0.2-0.4 mol/l. The concentration of the dilute sulfuric acid may be 0.1-0.5 mol/l, and preferably 0.2-0.4 mol/l.

The preparation method according to the present invention, wherein the drying in step (5) may be air drying at room temperature or oven drying.

The present inventors have surprisingly found that, in the method for preparing graphene material using waste tires according to the present invention, KOH is uniformly mixed with a tire powder, and KOH can etch rubber particles during high temperature to cause rubber particles to be thinned and intertwined so as to form large-lump carbon sheets with many sheet-like protrusions, and carbonization of these sheets leads to formation of graphene, which finally constitutes intertwined three-dimensional graphene having a unique structure.

According to another aspect of the present invention, the present invention also provides a graphene material which is prepared by a method comprising the steps of:

(1) crushing waste tires to 30-200 meshes to obtain a tire powder;

(2) mixing 1 part by weight of the tire powder obtained in step (1) with 1-10 parts by weight of KOH or an aqueous solution containing 1-10 parts by weight of KOH to obtain a homogeneous mixture;

(3) drying the mixture obtained in step (2) at 50-90° C. for 12-48 h;

(4) placing the dried mixture in a tube furnace and heating and calcining under a protective gas for 1-48 h to obtain a black lump; and (5) washing the black lump obtained in step (4) with water, dilute hydrochloric acid or dilute sulfuric acid for at least 3 times, and then washing it with water for at least 3 times to obtain a black powder, and drying the black powder to obtain the graphene material.

The graphene material according to the present invention, preferably, in step (2), 1 part by weight of the tire powder obtained in the step (1) is mixed with 1-7 parts by weight of KOH or an aqueous solution containing 1-7 parts by weight of KOH. More preferably, in step (2), 1 part by weight of the tire powder obtained in step (1) is mixed with 2-5 parts by weight of KOH or an aqueous solution containing 2-5 parts by weight of KOH.

The graphene material according to the present invention, preferably, the rate of the heating in step (4) is 0.1-20° C. per minute, the temperature for the calcination is 800-1200° C., and the duration for the calcination after reaching 800-1200° C. is 1-48 h. More preferably, the rate of the heating in step (4) is 2-15° C. per minute, the temperature for the calcination is 900-1100° C., and the duration for the calcination after reaching 900-1100° C. is 3-12 h.

According to yet another aspect of the present invention, the present invention also provides a graphene material which is prepared using waste tires and has a three-dimensional structure composed of few-layer graphene intertwined and connected with each other.

The graphene material according to the present invention, wherein the X-ray diffraction pattern of the graphene material is as shown in FIG. 4.

The graphene material according to the present invention, wherein the graphene material has a gradient porosity.

The graphene material prepared using waste tires and the preparation method thereof provided by the present invention have the following advantages:

(1) waste tires are converted into high-value three-dimensional graphene material, opening up a high added-value disposal path for waste tires;

(2) the method for preparing graphene material of the present invention adopts alkaline environment, and is a green preparation process compared with existing preparation methods using strong acids/strong oxidizing agents;

(3) the preparation method of the present invention has a simple operation and a relatively low preparation temperature, and is suitable for large-scale production;

(4) the graphene material of the present invention is composed of few-layer graphene intertwined with each other, has a high crystallinity, is not easily agglomerated, and thus can easily maintain nano-effect of the graphene material; and the graphene has a larger size being a micron-sized graphene material;

(5) the graphene material of the present invention has a clear pore size gradient and is an excellent graded porous graphene material; and (6) the graphene material of the present invention has important practical values in the fields of capacitors, batteries, sensors, catalysis, etc.

Various other objects, advantages and features of the present invention will become readily apparent from the ensuing detailed description, and the novel features will be particularly pointed out in the appended claims.

BRIEF DESCRIPTION OF FIGURES

The following detailed descriptions, given by way of example, and not intended to limit the present invention solely thereto, will be best be understood in conjunction with the accompanying figures:

FIG. 9 is a graph showing the pore size distribution of the graphene material obtained in Example 1 of the present invention, wherein FIG. 9A is a micropore distribution curve graph, and FIG. 9B is a mesopore distribution curve graph;

DETAILED DESCRIPTION OF THE EMBODIMENTS

The present invention is further described in detail with reference to the specific embodiments thereof below. The examples are given only to illustrate the present invention but not intended to limit the scope of the present invention.

Example 1

(1) crushing waste tires to a 100-mesh tire powder;

(2) mixing 5 g of the tire powder in step (1) with 15 ml of an aqueous solution containing 10 g of KOH and grinding them to uniformity to obtain a mixture slurry;

(3) placing the slurry ground to uniformity into an oven and drying it at 80° C. for 12 h;

(4) placing the dried mixture in a nickel crucible, and calcining it in a tube furnace under the protection of argon gas; setting the heating rate to 5° C./min, raising the temperature to 1000° C. and calcining it at 1000° C. for 8 h to obtain a black lump; and (5) cooling the black lump to room temperature in a tube furnace, taking it out followed by washing it with 0.3 mol/l dilute sulfuric acid for 5 times, and then washing it with deionized water for 3 times to obtain a black powder, and drying the black powder at 90° C. for 12 h to obtain a graphene material.

Performance Test and Characterization

The graphene material obtained in Example 1, conductive carbon black, and polytetrafluoroethylene (PTFE) were ground and mixed uniformly at a mass ratio of 8:0.5:1, and then they were rolled into a thin film of about 1.5 mg/cm². The thin film was cut into 1 cm² sheet, which was subjected to the supercapacitor performance with three electrodes in a KOH electrolyte with a concentration of 6 mol/l. A −1V-0V cyclic voltammetry test and a constant-current charge and discharge test were performed at room temperature. The cycle life was tested by performing 10000 charge and discharge cycles at a current density of 5 A/g.

Figure 1:
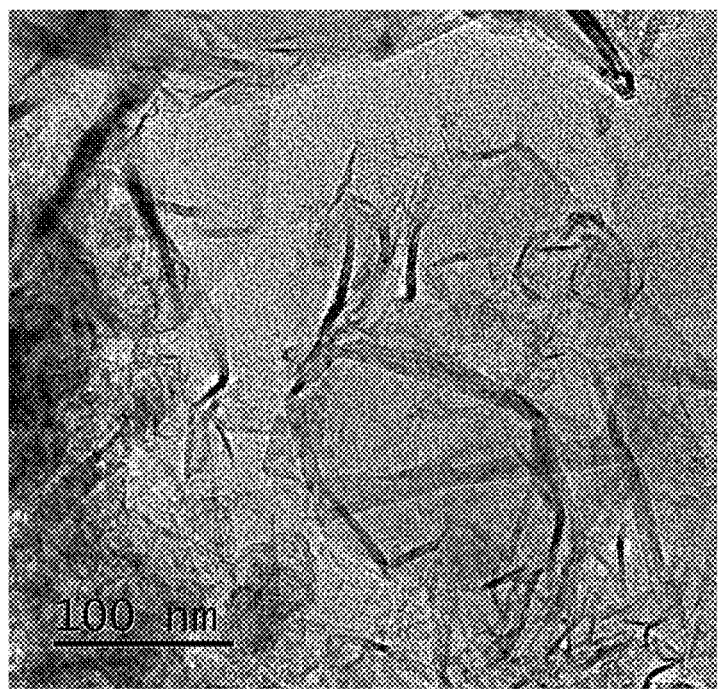
FIG. 1 is a transmission electron micrograph of the graphene material obtained in Example 1 of the present invention.
Figure 2:
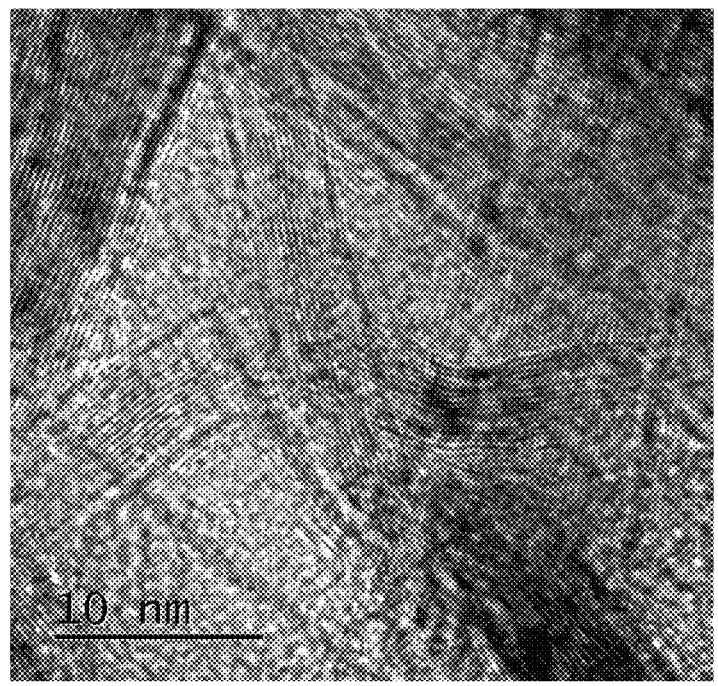
FIG. 2 is a high-resolution transmission electron micrograph of the graphene material obtained in Example 1 of the present invention.

FIG. 1 is a transmission electron micrograph of the graphene material obtained in this example. As can be seen from FIG. 1, the obtained graphene material has a three-dimensional structure and exhibits many distinct wrinkle textures. FIG. 2 is a high-resolution transmission electron micrograph of the graphene material obtained in this example. The high-resolution transmission electron microscopy shows that these wrinkle textures are composed of few-layer graphene intertwined and connected with each other. The intertwined graphene sheets are independent of and interconnected with each other, thereby avoiding stacking of graphene while maintaining the nano-effect of the graphene material.

Figure 3:
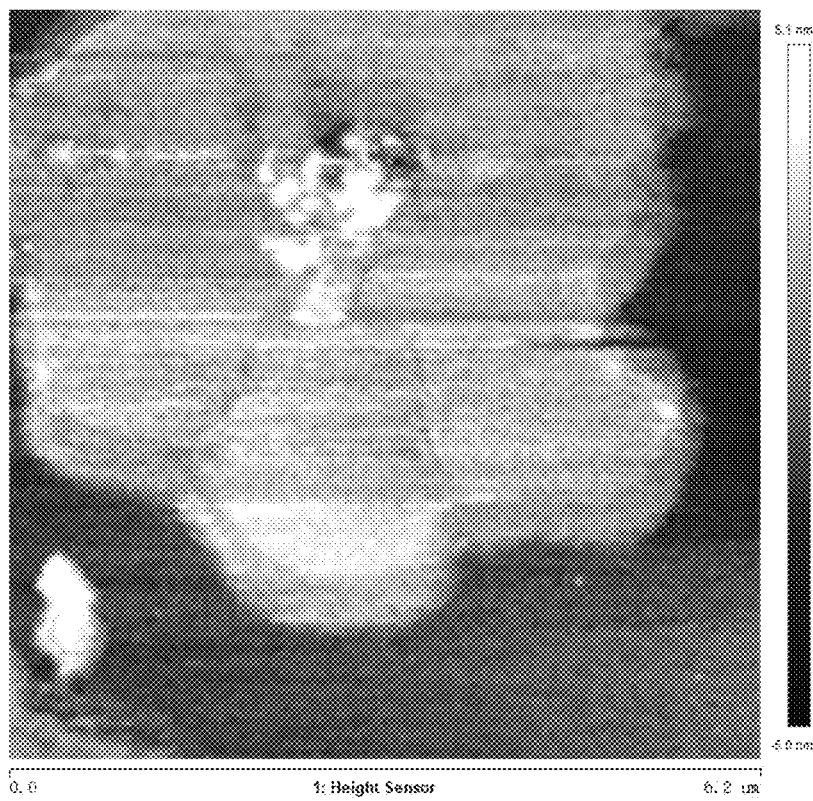
FIG. 3 is an atomic force micrograph of the graphene material obtained in Example 1 of the present invention.
Figure 4:
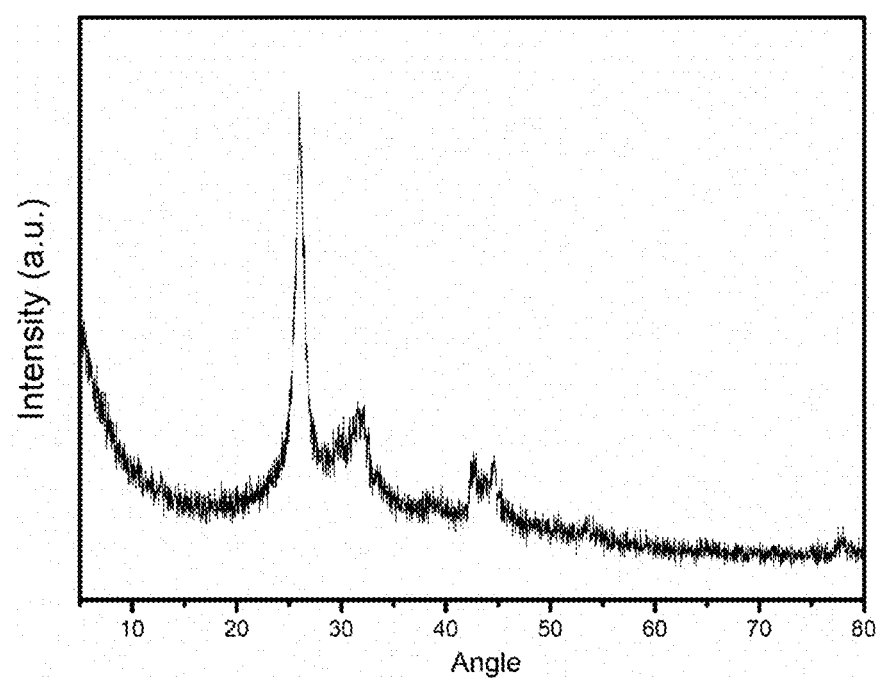
FIG. 4 is an X-ray diffraction pattern of the graphene material obtained in Example 1 of the present invention.

FIG. 3 is an atomic force micrograph of the graphene material obtained in this example, and shows that the thickness of the graphene sheet is 4 nm or less. FIG. 4 is an X-ray diffraction pattern of the graphene material obtained in this example. The X-ray diffraction pattern shows a sharp peak at 26 degrees, which indicates the appearance of a high-quality graphite crystal structure, thereby indicating that the graphene material of the present invention has a good crystal structure.

Figure 5:
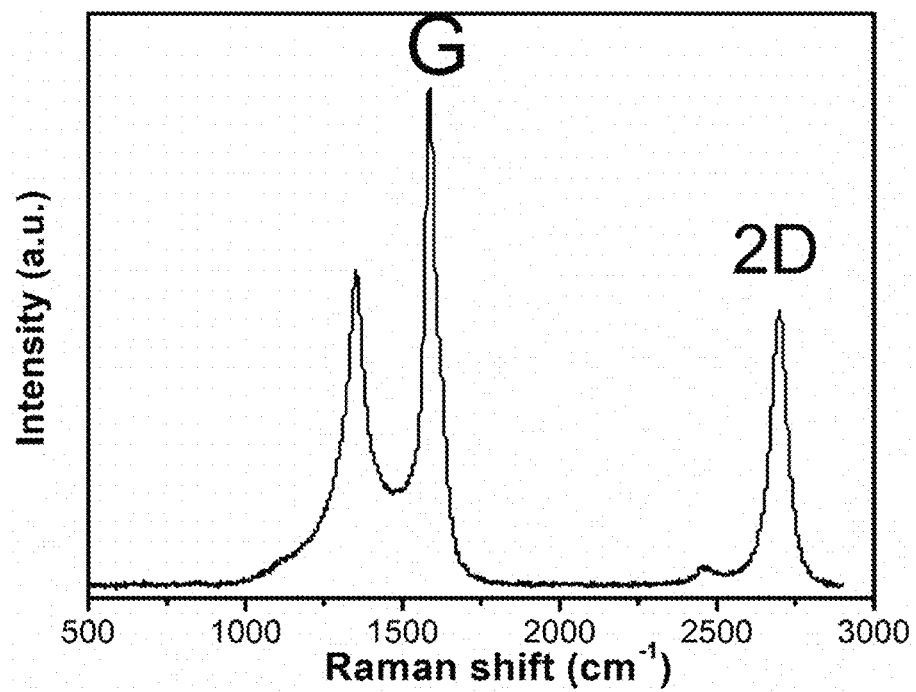
FIG. 5 is a Raman spectrum of the graphene material obtained in Example 1 of the present invention.

FIG. 5 is a Raman spectrum of the graphene material obtained in this example. The Raman spectrum can illustrate the structure and the number of layers of the graphite material. FIG. 5 shows a distinct 2D peak, which is a unimodal peak with good symmetry, reflecting the structure of a typical few-layer graphene. The G peak is a sharp peak, which also indicates that the material has a good graphite crystal structure. At the same time, the D peak at around 1330 cm$^{-1}$ reflects possible existence of many defective structures in the graphite sheet. These defect structures may be related to the porosity of the material, which facilitate the storage of energy in the material and indicate more active sites.

Figure 6:
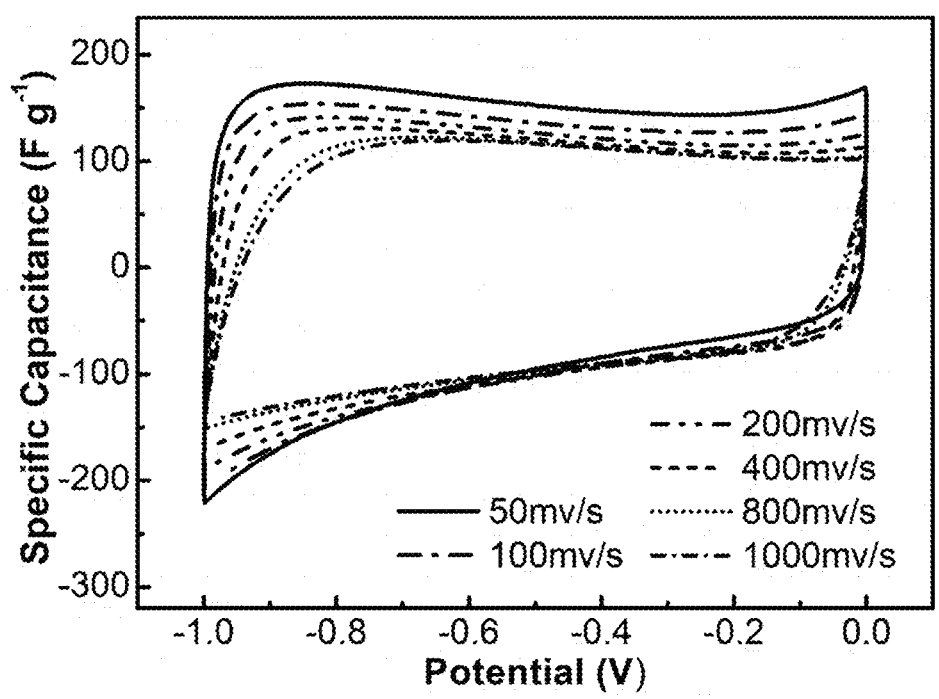
FIG. 6 is a cyclic voltammetry curve of the graphene material obtained in Example 1 of the present invention.

FIG. 6 is a cyclic voltammetry curve of the graphene material obtained in this example. The cyclic voltammetry curve test shows a rectangular-like volt-ampere curve, which indicates that the material exhibits the desired electrochemical behavior. Moreover, the volt-ampere curve maintains a good rectangular shape as the scan rate increases, which indicates that the material can maintain a good structural stability at different voltages. This benefits from the three-dimensional intertwined graphene structure.

Figure 7:
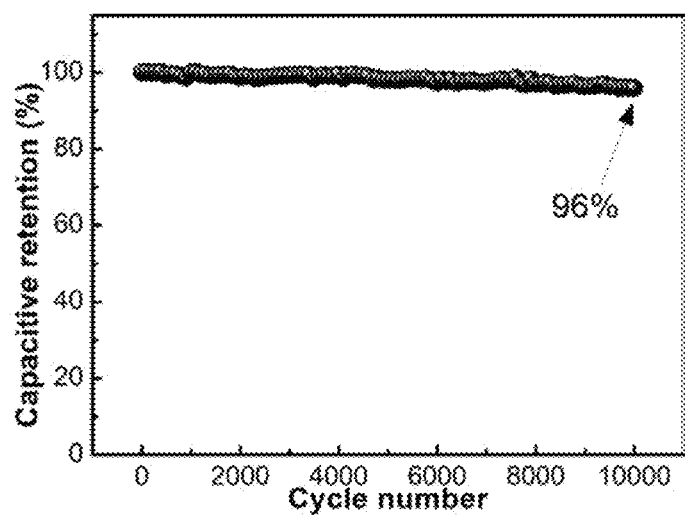
FIG. 7 is a graph showing the charge and discharge life of the graphene material obtained in Example 1 of the present invention.

The cyclic life of the material was tested by multiple repeated constant-current charge and discharge tests. FIG. 7 is a graph showing the charge and discharge life of the graphene material obtained in this example. FIG. 7 shows that the final capacitive retention is up to 96% after 10000 cycle charge and discharge tests at a current density of 5 A g$^{-1}$. This indicates that the obtained graphene material has an excellent stability.

Figure 8:
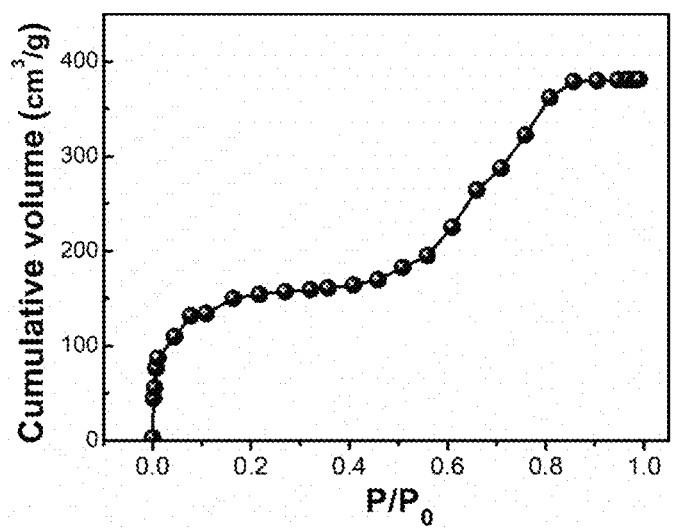
FIG. 8 is a graph showing an adsorption curve (DFT mode) of the graphene material obtained in Example 1 of the present invention.
Figures 9, 9A, 9B:
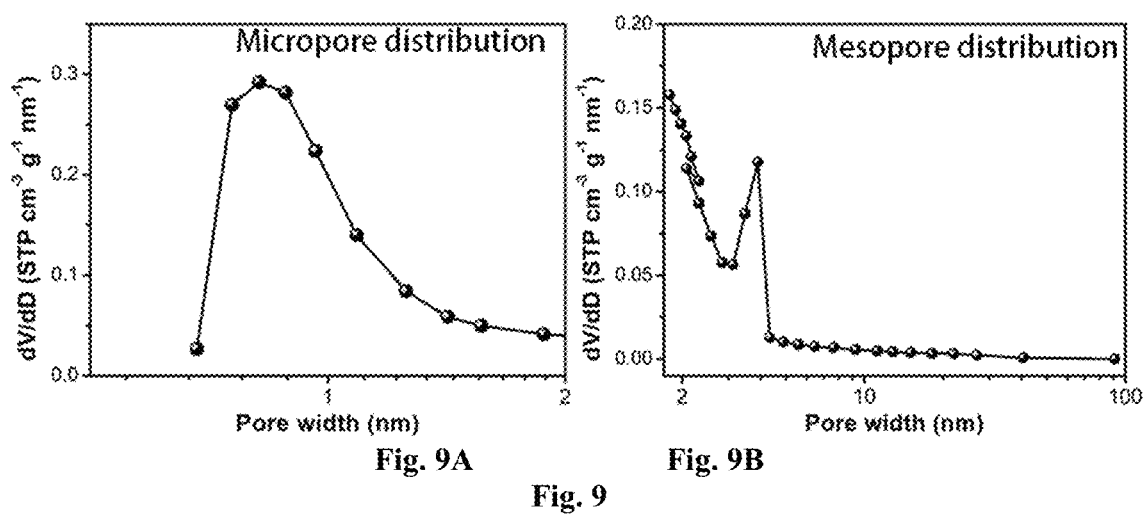

The porous properties of the material were characterized by a nitrogen gas desorption curve using Micromeritics ASAP2020 Rapid Specific Surface and Porosity Analyzer (Micromeritics Instrument Corp.). FIG. 8 is a graph showing the adsorption curve (DFT mode) of the graphene material obtained in this example. FIG. 9 is a graph showing a pore size distribution of the graphene material obtained in Example 1 of the present invention, wherein FIG. 9A is a micropore distribution curve graph, and FIG. 9B is a mesopore distribution curve graph. FIG. 8 shows that there is a vertically rising linear region in the low-pressure region, the adsorption in the low-pressure region corresponds to the existence of a large number of micropores, and the increase in the adsorption cumulative volume in the medium-high pressure region indicates the existence of the mesoporous structure. It can be seen from the pore size distribution curve graph shown in FIG. 9 that a distinct peak appears in both the micropore region and the mesopore region, indicating that the material has a distinct gradient porosity.

Comparative Example 1

The graphene material used in this comparative example is a mechanically stripped single-layer graphene sample purchased from Nanjing XFNANO Materials Tech Co., Ltd. with a product number: XF001W.

Figure 10:
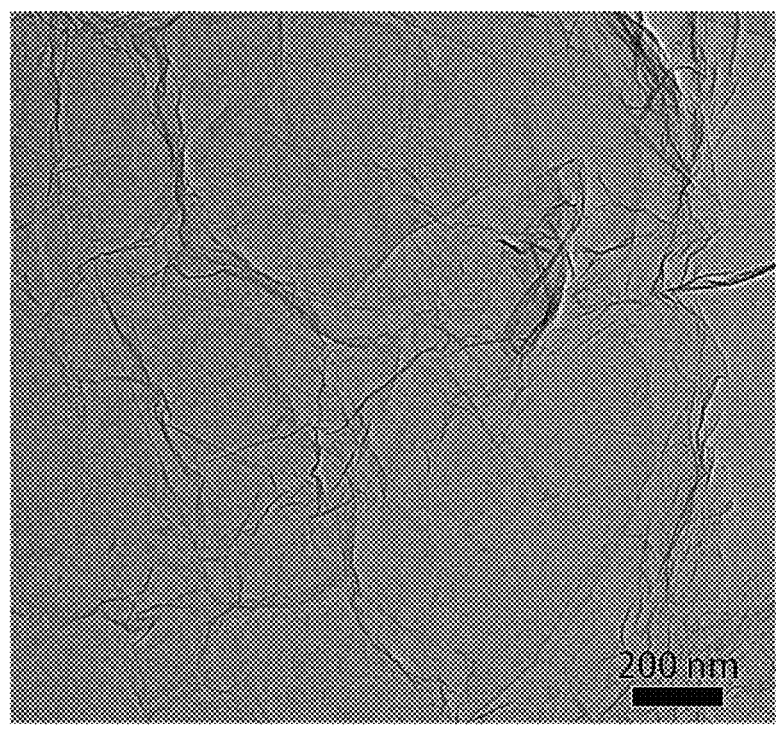
FIG. 10 is a transmission electron microscope (TEM) image of the graphene sample of Comparative Example 1.
Figure 11:
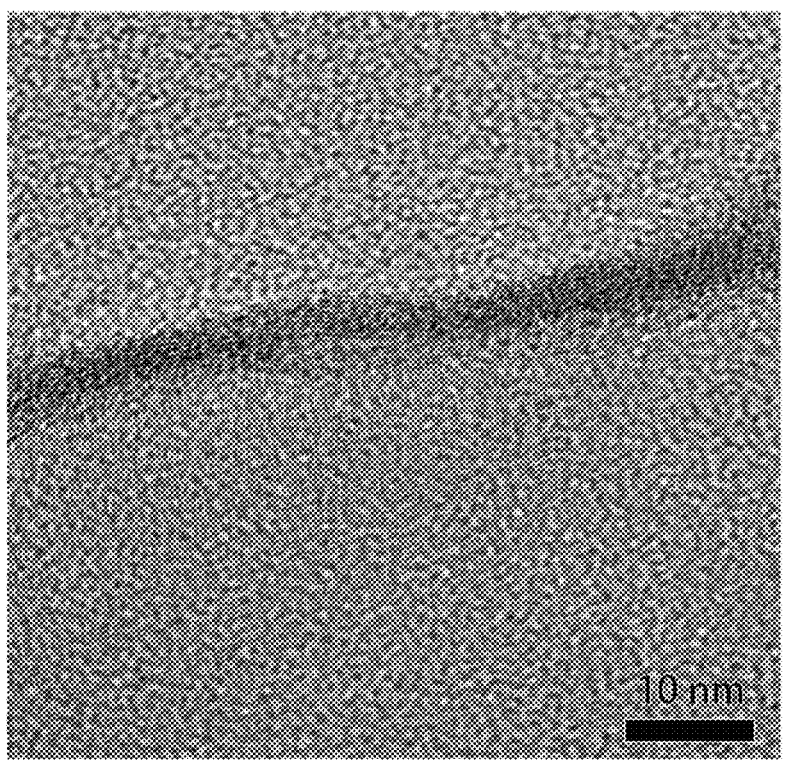
FIG. 11 is a high-resolution transmission electron microscope (HRTEM) image of the graphene sample of Comparative Example 1.
Figure 12:
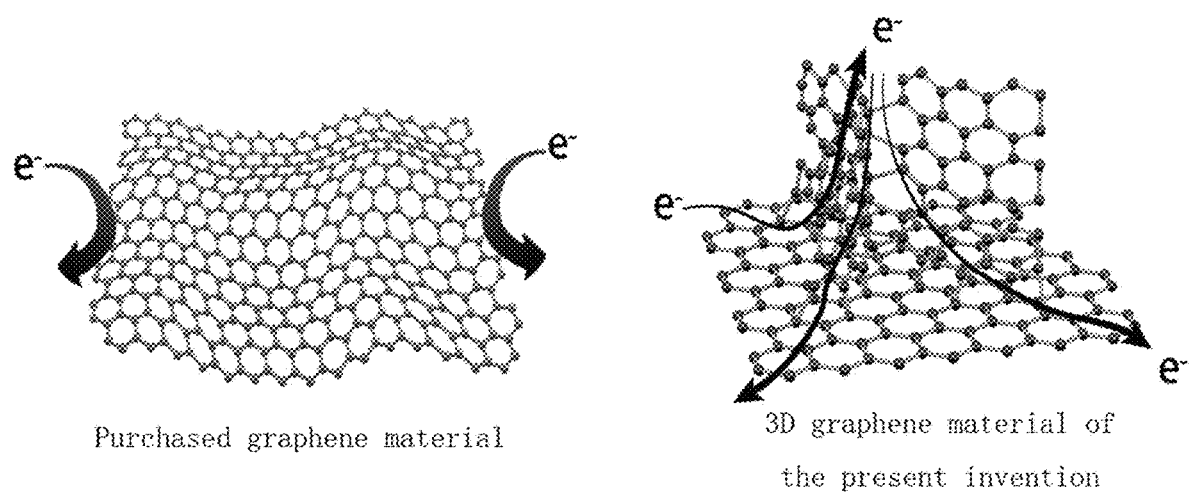
FIG. 12 is a schematic diagram showing the comparison between the electron conduction of the graphene sample of Comparative Example 1 and the electron conduction of the three-dimensional porous graphene material of the present invention.
Figure 13:
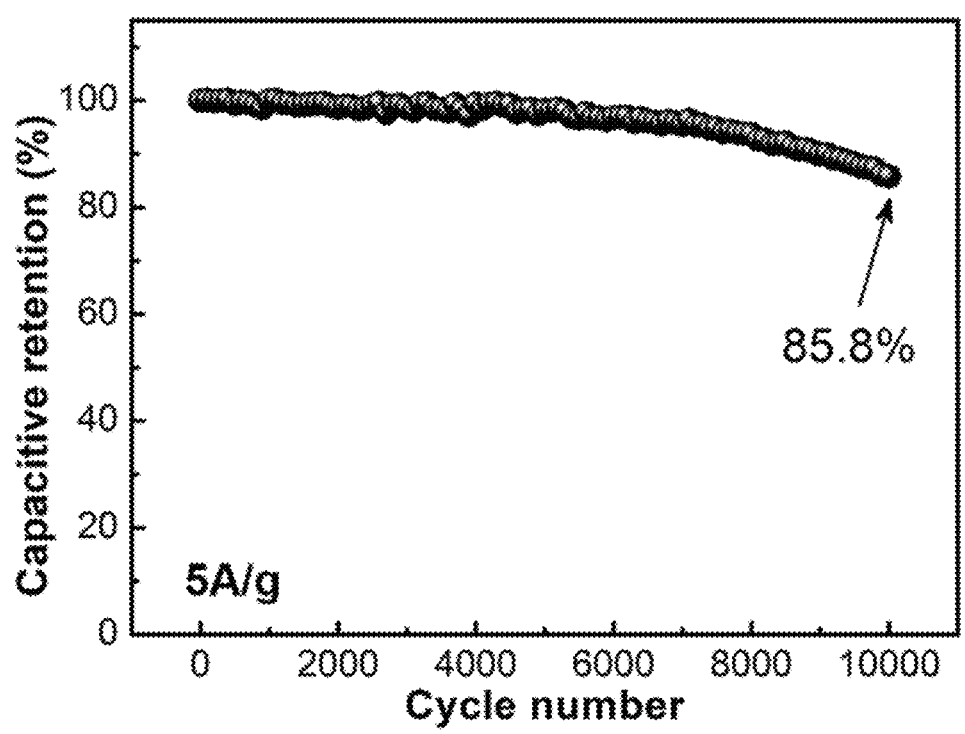
FIG. 13 is a graph showing the charge and discharge life of the graphene sample of Comparative Example 1.

FIG. 10 is a transmission electron microscope (TEM) image of the graphene sample of this comparative example. FIG. 11 is a high-resolution transmission electron microscope (HRTEM) image of the graphene sample of this comparative example. FIG. 12 is a schematic diagram showing the comparison between the electron conduction of the graphene sample of this comparative example and the electron conduction of the three-dimensional porous graphene material of the present invention. FIG. 13 is a graph showing the charge and discharge life of the graphene sample of this comparative example.

Conventional graphene has a two-dimensional (2D) structure, and can conduct electrons only in a two-dimensional plane when serving as electrode material. The three-dimensional (3D) graphene structure obtained in the present invention provides a shorter path for electron conduction, has easier ion diffusion, smallest electron transport resistance, and thus has a better high-current charge and discharge performance. In addition, conventional 2D graphene will stack on each other during charge and discharge due to the intermolecular forces, thereby losing original nano properties and leading to degradation of performance. The present invention obtains such an intertwined 3D structure that can well inhibit the mutual stacking of the 2D nanosheets, thereby maintaining very good electron conduction performance all the time, and thus maintaining a good performance stability during repeated charge and discharge processes.

Example 2

(1) crushing waste tires to a 100-mesh tire powder;
(2) mixing 5 g of the tire powder obtained in step (1) with 15 ml of an aqueous solution containing 10 g of KOH and grinding them to uniformity to obtain a mixture slurry;
(3) placing the slurry ground to uniformity into an oven and drying it at 60° C. for 24 h;
(4) placing the dried material in a nickel crucible, calcining it in a tube furnace under the protection of argon gas, setting the heating rate to 10° C./min, heating to 1050° C. and calcining it at 1050° C. for 5 h to obtain a black lump; and (5) cooling the black lump to room temperature in a tube furnace, taking it out followed by washing it with 0.3 mol/l dilute hydrochloric acid for 4 times, and then washing it with deionized water for 3 times to obtain a black powder, and drying the black powder at 90° C. for 12 h to obtain a three-dimensional porous graphene material, which has a similar X-ray diffraction spectrum with that of the material prepared in Example 1.

Example 3

(1) crushing waste tires to a 150-mesh tire powder;
(2) mixing 5 g of the tire powder obtained in step (1) with 15 ml of an aqueous solution containing 10 g of KOH and grinding them to uniformity to obtain a mixture slurry;
(3) placing the slurry ground to uniformity into an oven and drying it at 80° C. for 12 h;
(4) placing the dried material in a nickel crucible, and calcining it in a tube furnace under the protection of argon gas, setting the heating rate to 5° C./min, heating to 1000° C. and calcining it at 1000° C. for 8 h to obtain a black lump; and
(5) cooling the black lump to room temperature in a tube furnace, taking it out followed by washing it with 0.3 mol/l dilute sulfuric acid for 5 times, and then washing it with deionized water for 3 times to obtain a black powder, and drying the black powder at 90° C. for 12 h to obtain a three-dimensional porous graphene material, which has a similar X-ray diffraction spectrum with that of the material prepared in Example 1.

Example 4

(1) crushing waste tires to a 50-mesh tire powder;
(2) mixing 5 g of the tire powder obtained in step (1) with 15 ml of an aqueous solution containing 10 g of KOH and magnetic stirring them for 24 h to uniformity to obtain a mixture slurry;
(3) placing the slurry ground to uniformity into an oven and drying it at 80° C. for 12 h;
(4) placing the dried material in a nickel crucible, calcining it in a tube furnace under the protection of argon gas, setting the heating rate to 5° C./min, heating to 1100° C. and calcining it at 1100° C. for 3 h to obtain a black lump; and
(5) cooling the black lump to room temperature in a tube furnace, taking it out followed by washing it with deionized water for 6 times to obtain a black powder, and drying the black powder at 80° C. for 12 h to obtain a three-dimensional porous graphene material, which has a similar X-ray diffraction spectrum with that of the material prepared in Example 1.

Example 5

(1) crushing waste tires to a 120-mesh tire powder;
(2) mixing 5 g of the tire powder obtained in step (1) with 15 ml of an aqueous solution containing 20 g of KOH and grinding them to uniformity to obtain a mixture slurry;
(3) placing the slurry ground to uniformity into an oven and drying it at 80° C. for 12 h;
(4) placing the dried material in a nickel crucible, calcining it in a tube furnace under the protection of argon gas, setting the heating rate to 10° C./min, heating to 1000° C. and calcining it at 1000° C. for 5 h to obtain a black lump; and (5) cooling the black lump to room temperature in a tube furnace, taking it out followed by washing it with 0.3 mol/l dilute sulfuric acid for 5 times, and then washing it with deionized water for 3 times to obtain a black powder, and air drying the black powder at room temperature to obtain a three-dimensional porous graphene material, which has a similar X-ray diffraction spectrum with that of the material prepared in Example 1.

Figure 14:
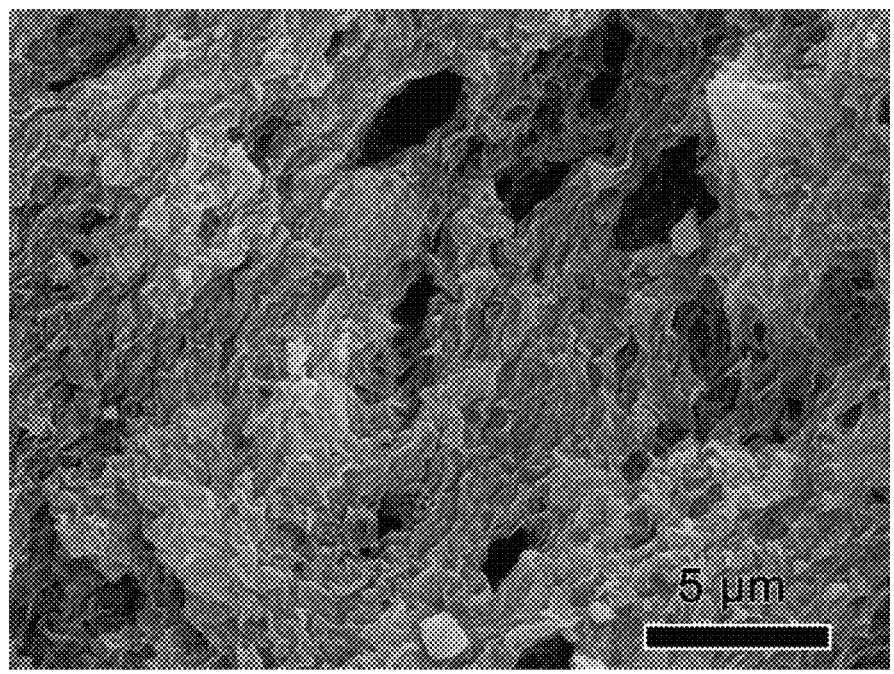
FIG. 14 is an SEM image of the graphene material obtained in Example 2 of the present invention.
Figure 15:
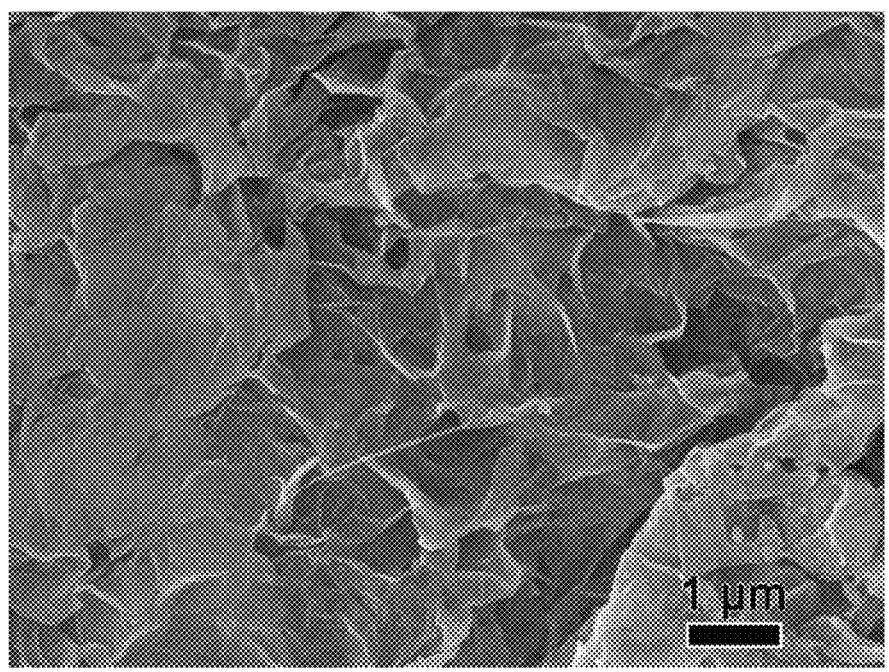
FIG. 15 is an SEM image of the graphene material obtained in Example 3 of the present invention.

FIG. 14 is an SEM image of the graphene material obtained in Example 2 of the present invention; and FIG. 15 is an SEM image of the graphene material obtained in Example 3 of the present invention. As can be seen from FIG. 14 and FIG. 15, after the preparation conditions vary, the obtained graphene material still has a three-dimensional structure composed of few-layer graphene intertwined and connected with each other. The intertwined graphene sheets are independent of and interconnected with each other, thereby avoiding stacking of graphene while maintaining the nano-effect of the graphene material.

Finally, it should be noted that the above embodiments are merely illustrative of the technical solutions of the present invention, but not intended to be limiting; although the present invention has been described in detail with reference to the foregoing embodiments, those skilled in the art will understand that the technical solutions described in the foregoing embodiments may be modified, or some or all of the technical features therein may be equivalently substituted; and the modifications or substitutions do not deviate the nature of the corresponding technical solution from the scopes of the technical solutions of the embodiments of the present invention, and they all fall within the scope of the claims and the description of the present invention.

The invention claimed is:

1. A method for preparing a graphene material using waste tires, comprising the steps of:
   (1) crushing waste tires to 30-200 meshes to obtain a tire powder;
   (2) mixing 1 part by weight of the tire powder obtained in step (1) with 1-10 parts by weight of KOH or an aqueous solution containing 1-10 parts by weight of KOH to obtain a homogeneous mixture;
   (3) drying the mixture obtained in step (2) at 50° C.-90° C. for 12-48 h;
   (4) placing the dried mixture in a tube furnace and heating and calcining under a protective gas for 1-48 h to obtain a black lump; and
   (5) washing the black lump obtained in the step (4) with water, dilute hydrochloric acid or dilute sulfuric acid for at least 3 times, then washing it with water for at least 3 times to obtain a black powder, and then drying the black powder to obtain the graphene material.

2. The method in claim 1, wherein the tire powder in step (1) is 50-150 meshes.

3. The method in claim 1, wherein in step (2), 1 part by weight of the tire powder obtained in the step (1) is mixed with 1-7 parts by weight of KOH or an aqueous solution containing 1-7 parts by weight of KOH.

4. The method in claim 1, wherein in step (2), 1 part by weight of the tire powder obtained in the step (1) is mixed with 2-5 parts by weight of KOH or an aqueous solution containing 2-5 parts by weight of KOH.

5. The method in claim 1, wherein the temperature for the drying in step (3) is 60° C.-80° C., and the duration for the drying is 12-24 h.

6. The method in claim 1, wherein the protective gas in step (4) is at least one of nitrogen gas, argon gas and helium gas.

7. The method in claim 1, wherein:
the rate of the heating in step (4) is 0.1° C.-20° C. per minute;
the temperature for the calcination is 800° C.-1200° C.; and
the duration for the calcination after reaching 800° C.-1200° C. is 1-48 h.

8. The method in claim 1, wherein:
the rate of the heating in step (4) is 2° C.-15° C. per minute;
the temperature for the calcination is 900° C.-1100° C.; and
the duration for the calcination after reaching 900° C.-1100° C. is 3-12 h.

9. The method in claim 1, wherein the concentration of the dilute hydrochloric acid in step (5) is 0.1-0.5 mol/l.

10. The method in claim 1, wherein the concentration of the dilute hydrochloric acid in step (5) is 0.2-0.4 mol/l.

11. The method in claim 1, wherein the concentration of the dilute sulfuric acid in step (5) is 0.1-0.5 mol/l.

12. The method in claim 1, wherein the concentration of the dilute sulfuric acid in step (5) is 0.2-0.4 mol/l.

13. The method in claim 1, wherein the drying in step (5) is air drying at room temperature or oven drying.

\* \* \* \* \*